United States Patent
Xiao et al.

(10) Patent No.: US 8,470,468 B2
(45) Date of Patent: Jun. 25, 2013

(54) LITHIUM-ION BATTERIES WITH COATED SEPARATORS

(75) Inventors: Xingcheng Xiao, Troy, MI (US); Xiaosong Huang, Sterling Heights, MI (US); Mark W. Verbrugge, Troy, MI (US); Ion C. Halalay, Grosse Pointe Park, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 552 days.

(21) Appl. No.: 12/704,694

(22) Filed: Feb. 12, 2010

(65) Prior Publication Data
US 2011/0200863 A1     Aug. 18, 2011

(51) Int. Cl.
*H01M 2/16*     (2006.01)
(52) U.S. Cl.
USPC .......................................................... 429/144
(58) Field of Classification Search
None
See application file for complete search history.

(56) References Cited

U.S. PATENT DOCUMENTS

| 5,681,357 | A | 10/1997 | Eschbach et al. |
| 5,981,107 | A | 11/1999 | Hamano et al. |
| 2005/0241933 | A1* | 11/2005 | Branton et al. .......... 204/192.34 |

OTHER PUBLICATIONS

Cambridgenanotech Simply Ald; Cambridge NanoTech Corporate Overview; Aug. 2009.

* cited by examiner

*Primary Examiner* — Patrick Ryan
*Assistant Examiner* — Wyatt McConnell
(74) *Attorney, Agent, or Firm* — Reising Ethington P.C.

(57) ABSTRACT

A porous polymer sheet or membrane is provided with a thin coating of an electrically non-conductive ceramic composition and the coating conforms to all surfaces, including the pore surfaces, of the membrane. Such a coated membrane serves well, for example, as an intra-cell separator in a lithium ion battery. The coating increases the mechanical properties and thermal stability of the separator in battery operation and retains electrolyte. The coating may be formed by a two-step vapor-phase process in which atoms of one or more metals such as aluminum, calcium, magnesium, titanium, silicon and/or zirconium are deposited in a conformal layer on a workpiece surface. The metal atoms may then be reacted with ammonia, carbon dioxide, and or water to form their respective non-conductive nitrides, carbides, and/or oxides on the surface. The two-step process is repeated as necessary to obtain a ceramic material coating of desired thickness.

14 Claims, 3 Drawing Sheets

Uncoated Separator

Coated Separator

LITHIUM-ION BATTERIES WITH COATED SEPARATORS

TECHNICAL FIELD

This invention pertains to porous polymeric separators for insertion between electrodes in the assembly of lithium-ion batteries. More specifically, this invention pertains to deposition of conformal, electronically non-conductive, ceramic coatings on the surfaces, including pore surfaces, of such separators. Such surface-conforming coatings retain the porosity of the separator for electrolyte retention and function, and strengthen and protect the separators.

BACKGROUND OF THE INVENTION

Lithium-ion secondary batteries are common in portable consumer electronics because of their high energy-to-weight ratios, lack of memory effect, and slow self-discharge when not in use. Rechargeable lithium-ion batteries are also being designed and made for use in automotive applications to provide energy for electric motors to drive vehicle wheels.

Lithium-ion batteries may be formed in different sizes and shapes but three common functional components are the anode, cathode, and electrolyte that make up cells of the battery. The anode on discharge becomes the cathode on charge, and the cathode on discharge becomes the anode on charge. From here forward, we shall refer to the electrode that is the anode on discharge (the negative electrode) as the anode, and the electrode that is the cathode on discharge (the positive electrode) as the cathode. A porous separator is often used to contain electrolyte and prevent physical contact (electron-conducting contact) between the anode and cathode. Many cells may be arranged in series or parallel electrical current flow connection, or any suitable combination thereof, to meet the electrical potential and power requirements of a battery design.

A lithium-ion battery generally operates by reversibly passing lithium ions between a negative electrode and a positive electrode. The negative and positive electrodes are situated on opposite sides of a microporous polymer separator that is soaked with an electrolyte solution suitable for conducting lithium ions. Each of the negative and positive electrodes is also carried on or connected to a metallic current collector (typically copper for the anode and aluminum for the cathode). During battery usage, the current collectors associated with the two electrodes are connected by a controllable and interruptible external circuit that allows an electron current to pass between the electrodes to electrically balance the related transport of lithium ions through each cell. Many different materials may be used to produce these various components of a lithium-ion battery. But in general, the negative electrode typically includes a lithium insertion material or alloy host material, the positive electrode typically includes a lithium-containing active material that can store lithium at higher potential (relative to a lithium metal reference electrode) than the host material of the negative electrode, and the electrolyte solution typically contains one or more lithium salts dissolved and ionized in a non-aqueous solvent. The contact of the anode and cathode materials with the electrolyte results in an electrical potential between the electrodes and, when an electron current is exploited in an external circuit between the electrodes, the potential is sustained by electrochemical reactions within the cells of the battery.

A lithium-ion battery, or a plurality of lithium-ion batteries that are connected in a series or a parallel arrangement (or any suitable combination thereof) for current flow, can be utilized to reversibly supply power to an associated load device. The battery system delivers electrical power on demand to a load device such as an electric motor until the lithium content of the negative electrode (anode) has been depleted to a predetermined level. The battery may then be re-charged by passing a suitable direct electrical current in the opposite direction between the electrodes.

At the beginning of the discharge, the negative electrode of a lithium-ion battery contains a high concentration of intercalated lithium while the positive electrode is relatively depleted. The establishment of a closed external circuit between the negative and positive electrodes under such circumstances causes the transport of intercalated lithium from the negative anode. The intercalated lithium is oxidized into lithium ions and electrons. The lithium ions are carried from the negative electrode (anode) to the positive electrode (cathode) through the ionically conductive electrolyte solution contained in the pores of the interposed polymer separator while, at the same time, the released electrons are transmitted through the external circuit from the negative electrode to the positive electrode (with the help of the current collectors), to balance the overall reaction occurring in the electrochemical cell. The lithium ions are assimilated into the cathode material by an electrochemical reduction reaction. The flow of electrons through the external circuit can power a load device until the level of intercalated lithium in the negative electrode falls below a workable level or the need for power ceases.

The lithium-ion battery may be recharged after a partial or full discharge of its available capacity. To charge or re-power the lithium-ion battery, an external power source is connected to the positive and the negative electrodes to drive the reverse of battery discharge electrochemical reactions. That is, during charging, the lithium within the positive electrode is oxidized to yield lithium cations and electrons. The cations transport across the separator to the negative electrode, and the electrons travel through the external circuit to the negative electrode as well. At the surface of the negative electrode material, the lithium cations are reduced to lithium by combining with the available electrons within the negative, and the negative electrode lithium content increases. Overall, the charging process reduces the lithium content within the positive and increases the lithium content within the negative.

The separator serves an important function in each cell of a lithium-ion battery. In many lithium-ion battery constructions the negative and positive electrode materials are formed as thin, compacted, polymer bonded, particulate material layers on their respective current collectors (for example, copper or aluminum foils) and each cell is assembled with a thin, porous, polyolefin separator membrane inserted between the facing electrode layers. For example, polyethylene or polypropylene fibrous membranes have been used having a thickness of about twenty-five to about thirty microns and thirty-five percent or more porosity. Very small, open pores are formed in the thin polymer sheet to permit a liquid electrolyte to enter and flow through the separator membrane.

Thus, the pores and surfaces of the polyolefin membrane are filled and contacted with a lithium ion-containing, non-aqueous electrolyte that contacts and wets the facing electrode materials to enable the flow of lithium ions and counter-ions through the pores of the separator and between the electrodes. But the polymeric membrane resists the flow of electrons directly between the electrode materials.

Prior polymer separators have been filled with small particles of a ceramic material, such as silica or alumina, or surface-coated with polymer-bonded particles of such ceramics. The purpose of the ceramic particle additives has been to increase the puncture strength, dimensional stability at high temperatures (above which polymers such as polyethylene or polypropylene would exist in a molten state), and electrolyte retention capability of the separator membrane. However, the inventors herein have sought and found an improved method of preparing surface-coated porous separator structures and materials.

SUMMARY OF THE INVENTION

This invention provides a method of forming layers of molecules of a ceramic material on the surfaces of the pores and on the surfaces of the opposing sides of the polymeric separator membranes. Examples of suitable ceramic materials include aluminum oxide, silicon oxide, silicon carbide, titanium dioxide, magnesium oxide, boron nitride, and other compounds that are not electronically conductive but have appreciable thermal conductivity. The coating is formed atomic layer by atomic layer and molecular layer by molecular layer until a desired thickness of the ceramic composition is obtained. The coating is continuous (not like individual filler particles or coating particles) over the many surfaces and substantially uniform in thickness. Hence, the coating conforms to the surfaces of the separator membrane. There are several advantages of this atomic layer deposition (ALD) coating process over the conventional ceramic coated separator processes (dip-coating or making an organic-inorganic composite separator through melt-extrusion followed by solvent extraction), such as smaller environmental impact without involving chlorinated solvents, and uniformity of coating on separator surface.

Thus, this invention provides a porous separator membrane (or thicker sheet material) for a lithium-ion battery in which the pore walls and outside surfaces of the separator are uniformly coated with such a conforming layer of electrically non-conductive ceramic material. The conforming layer substantially retains the uncoated shape of the porous polymer membrane and it contributes to the electrolyte retention, mechanical strength and thermal stability of the membrane. The conforming layer also retains much of the pore volume and electrolyte retention capacity of the uncoated membrane while maintaining the electrical resistivity of the separator.

In accordance with a preferred embodiment of the invention, a conformal ceramic coating may be formed on surfaces of a porous polymeric separator workpiece by a type of chemical vapor deposition characterized as atomic layer deposition. Atomic layer deposition as described in this specification is used to form a conformal ceramic coating to all surfaces of a porous polymer workpiece, including its pore wall surfaces. By way of example, a method for forming a layer of aluminum oxide on the polyolefin surfaces will be illustrated. In the atomic layer process, atoms of aluminum and oxygen atoms are separately deposited (or formed) from suitable vapor compositions on the workpiece surfaces in distinct deposition or reaction steps. The use of suitable vapor or gas compositions permits effective chemical deposition on all surfaces of the workpiece that can be contacted by the vapor in which the workpiece is immersed. And it is intended that the flow of vapor or gas deposition media contact all surfaces of the separator membrane that are expected to be contacted by the liquid electrolyte in the operating lithium-ion battery.

A porous polyolefin membrane workpiece (for example, about thirty microns in thickness and having 35% to 50% or more of its superficial volume as pores) is cleaned, if necessary, to remove extraneous matter from its pores and main opposing membrane surfaces. The membrane workpiece may then be placed in a suitable reaction chamber as necessary for conduct of the step-wise conformal coating process. As will be seen, such a reaction chamber may have provision for the separate introduction of aluminum-containing vapor material and of oxygen-containing vapor material for the step-wise formation of the $Al_2O_3$ conformal layers.

While this invention is not restricted to olefin-based separator materials, the surface of a commonly employed polyolefin membrane (for example) is initially characterized by the presence of relatively inert (—$CH_2$—) groups. It is desired to attach aluminum-containing groups by reaction with moieties on the workpiece surface. Accordingly, the surface of the membrane may, for example, be treated with hydrogen peroxide or a hydrogen plasma to form an abundance of (—OH) groups on all surfaces (pore surfaces and body surfaces) of the membrane workpiece. The presence of the hydroxide groups at all surfaces of the membrane provides suitable reactive species for the deposition of aluminum-containing species to the surfaces of the workpiece. The hydroxide groups may be protected in an argon atmosphere and excess plasma or peroxide may be removed by a flow of argon gas.

A predetermined amount of aluminum, in the form of a suitable volatile compound such as trimethyl aluminum $[(CH_3)_3Al]$, is introduced as a vapor (for example at a temperature of about 50° C.) and flowed into contact with all of the surfaces of the membrane workpiece. The trimethyl aluminum reacts with the surface hydroxyl groups (chemisorption) to form dimethyl aluminum groups attached to surface-bonded oxygen groups $[(CH_3)_2Al—O-polyolefin]$ and releasing methane as a byproduct. Typically, reaction of the aluminum containing material with the polymer surface groups is completed in a short period (a few seconds). Excess reactants and by-products are removed from the vicinity and water vapor is then introduced into the reaction chamber to flow over the surfaces of the workpiece. The water reacts with the dimethyl aluminum groups on the surfaces to form aluminum oxide ($Al_2O_3$) and by-product methane. Some residual hydroxyl groups may remain on surfaces of the aluminum oxide molecular layer. This two-reaction process has resulted in the formation of a substantially mono-molecular layer of alumina that conforms to all vapor-contacted or gas-contacted surfaces of the polyolefin membrane. This layer may have a thickness of an Ångstrom or so.

This atomic layer deposition process may be repeated to build up a ceramic material layer to a suitable thickness. For example, the above described coating process has been repeated 30 times and 200 times in forming alumina coatings that have thicknesses of about ten to twenty nanometers. The resulting ceramic coatings conform to the many and irregular surfaces of the porous polymer membrane. The coatings are coextensive and substantially free of holes. As stated, these ceramic coatings permit essentially the same electrolyte access to the pores of the separator membrane as is achieved in an uncoated membrane, and the ionic resistance of the separator is not appreciably increased. The coatings increase the durability of the membrane in the battery environment, and they increase the temperature at which the separator membranes experience thermal shrinkage in the operating battery.

Ceramic compositions of electrically non-conductive oxides, carbides, or nitrides of aluminum or other metals such as calcium, magnesium, titanium, silicon, and zirconium may be formed on the polymer membrane surfaces. And the process may be practiced to form conformal coatings on other types of workpieces.

Other objects and advantages of the invention will be apparent from a description of illustrative embodiments of the invention which follow in this specification. Reference is had to drawing figures which are described in the following section of this specification.

DESCRIPTION OF PREFERRED EMBODIMENTS

The following description of the embodiment(s) is merely exemplary in nature and is not intended to limit the invention, its application, or uses.

Embodiments of this invention are practices to form conformal coatings on a porous polymeric workpiece such as a porous polyolefin substrate for a lithium-ion battery. Before further illustration of coating processes it may be helpful to illustrate the lithium-ion battery environment in which the separator functions.

Figure 1:
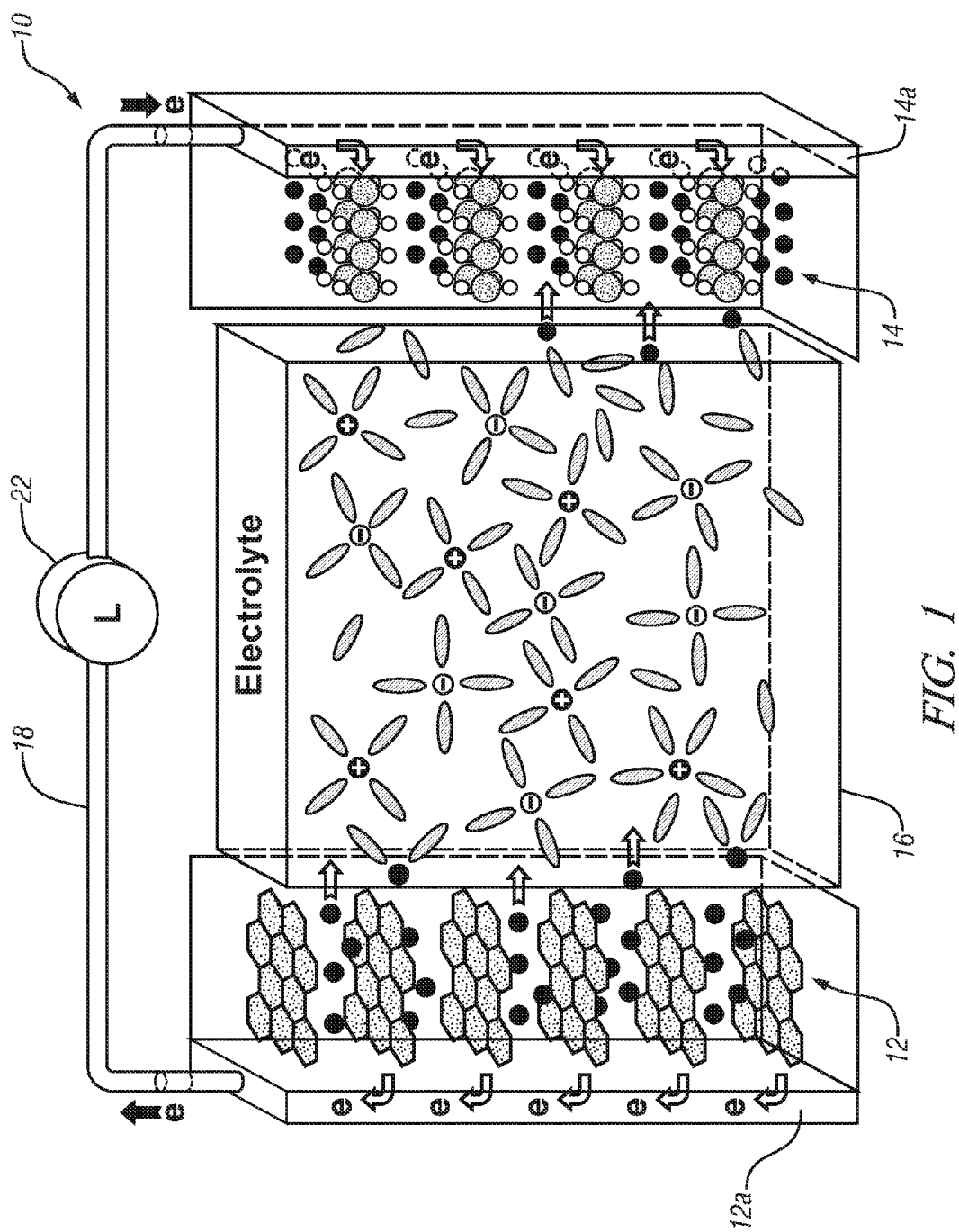
FIG. 1 is an enlarged, schematic illustration of a single cell of a lithium-ion battery in its discharge mode. This view illustrates the transport of lithium ions in discharge mode around and through a separator but does not illustrate a porous separator structure (see FIGS. 2A and 2B).

An exemplary and schematic illustration of a secondary lithium-ion battery 10 is shown in FIG. 1. Lithium-ion battery 10 includes a negative electrode 12, a positive electrode 14, a microporous polymer separator 16 (shown in enlarged outline view) sandwiched between the two electrodes 12, 14, and filled with Electrolyte. A negative electrode current collector 12a and a positive electrode current collector 14a may be positioned at or near the negative electrode 12 and the positive electrode 14, respectively, to collect and move free electrons to and from an external circuit 18. An interruptible external circuit 18 and load (L) 22 connects the negative electrode 12 (through its current collector 12a and the positive electrode 14 (through it current collected 14a. Each of the negative electrode 12, the positive electrode 14, and the microporous polymer separator 16 may be soaked in an electrolyte solution capable of conducting lithium ions. The microporous polymer separator 16, which operates as both an electrical insulator and a mechanical support, is sandwiched between the negative electrode 12 and the positive electrode 14 to prevent physical contact between the two electrodes 12, 14 and the occurrence of a short circuit. The microporous polymer separator 16, in addition to providing a physical barrier between the two electrodes 12, 14, may also provide a minimal resistance to the internal passage of lithium ions (and related anions) to help ensure the lithium ion battery 10 functions properly.

The lithium ion battery 10 may provide electric current to a load device 22 that can be operatively connected to the external circuit 18. The load device 22 may be powered fully or partially by the electric current passing through the external circuit 18 when the lithium ion battery 10 is discharging. While the load device 22 may be any number of known electrically-powered devices, a few specific examples of a power-consuming load device include an electric motor for a hybrid vehicle or an all-electrical vehicle, a laptop computer, a cellular phone, and a cordless power tool, to name but a few. The load device 22 may also, however, be a power-generating apparatus that charges the lithium ion battery 10 for purposes of storing energy. For instance, the tendency of windmills and solar panel displays to variably and/or intermittently generate electricity often results in a need to store surplus energy for later use.

The lithium ion battery 10 can include a wide range of other components that, while not depicted here, are nonetheless known to skilled artisans. For instance, the lithium ion battery 10 may include a casing, gaskets, terminal caps, and any other desirable components or materials that may be situated between or around the negative electrode 12, the positive electrode 12, and/or the microporous polymer separator 16 for performance related or other practical purposes. Moreover, the size and shape of the lithium ion battery 10 may vary depending on the particular application for which it is designed. Battery powered automobiles and hand-held consumer electronic devices, for example, are two instances where the lithium ion battery 10 would most likely be designed to different size, capacity, and power-output specifications. The lithium ion battery 10 may also be connected in series or parallel with other similar lithium ion batteries to produce a greater voltage output and power density if the load device 22 so requires.

The lithium ion battery 10 can generate a useful electric current during battery discharge by way of reversible electrochemical reactions that occur when the external circuit 18 is closed to connect the negative electrode 12 and the positive electrode 14 at a time when the negative electrode 12 contains a sufficiently higher relative quantity of intercalated lithium. The chemical potential difference between the positive electrode 14 and the negative electrode 12—approximately 3.7 to 4.2 volts depending on the exact chemical make-up of the electrodes 12, 14—drives electrons produced by the oxidation of intercalated lithium at the negative electrode 12 through the external circuit 18 toward the positive electrode 14. Lithium ions, which are also produced at the negative electrode, are concurrently carried by the electrolyte solution through the microporous polymer separator 16 and towards the positive electrode 14. The electrons flowing through the external circuit 18 and the lithium ions migrating across the microporous polymer separator 16 in the electrolyte solution eventually reconcile and form intercalated lithium at the positive electrode 14. The electric current passing through the external circuit 18 can be harnessed and directed through the load device 22 until the intercalated lithium in the negative electrode 12 is depleted and the capacity of the lithium ion battery 10 is diminished.

In FIG. 1, lithium atoms intercalated between graphite planar layers are illustrated as black-filled circles. As the lithium atoms are oxidized to lithium ions they are schematically illustrated with "+" signs in the dark circles associated with radial ionic charge symbols (i.e., the lithium ions are cations). At the positive electrode 14 the lithium ions are reduced to lithium atoms. They flow in the electrolyte through the porous separator membrane 16 and are inserted into the crystal structure of the positive electrode 14 composition. Anions, illustrated with "minus" signs in circles and associated with schematic radial charge symbols, are formed in the electrolyte composition and flow counter to the lithium ions.

The lithium ion battery 10 can be charged or re-powered at any time by applying an external power source to the lithium ion battery 10 to reverse the electrochemical reactions that occur during battery discharge. The connection of an external power source to the lithium ion battery 10 compels the otherwise non-spontaneous oxidation of intercalated lithium at the positive electrode 14 to produce electrons and lithium ions. The electrons, which flow back towards the negative electrode 12 through the external circuit 18, and the lithium ions, which are carried by the electrolyte across the microporous polymer separator 16 back towards the negative electrode 12, reunite at the negative electrode 12 and replenish it with intercalated lithium for consumption during the next battery discharge cycle. The external power source that may be used to charge the lithium ion battery 10 may vary depending on the size, construction, and particular end-use of the lithium ion battery 10. Some notable and exemplary external power sources include, but are not limited to, an AC wall outlet and a motor vehicle alternator. In many lithium-ion battery constructions each of the current collector 12a, negative electrode 12, the separator 16, the positive electrode 14, and its current collector 14a are prepared as relatively thin layers (for example, several microns or a millimeter or less in thickness) and assembled in layers connected in electrical parallel arrangement to provide a suitable energy package.

The negative electrode 12 may include any lithium host material that can sufficiently undergo lithium intercalation and de-intercalation while functioning as the negative terminal of the lithium ion battery 10. The negative electrode 12 may also include a polymer binder material to structurally hold the lithium host material together. For example, in one embodiment, the negative electrode 12 may be formed from graphite intermingled in at least one of polyvinyldiene fluoride (PVdF), a nitrile butadiene rubber (NBR), or carboxymethoxyl cellulose (CMC). Graphite is widely utilized to form the negative electrode because it exhibits favorable lithium intercalation and deintercalation characteristics, is relatively non-reactive, and can store lithium in quantities that produce a relatively high energy density. Commercial forms of graphite that may be used to fabricate the negative electrode 12 are available from, for example, Timcal Graphite & Carbon, headquartered in Bodio, Switzerland, Lonza Group, headquartered in Basel, Switzerland, or Superior Graphite, headquartered in Chicago, USA. Other materials can also be used to form the negative electrode including, for example, lithium titanate. The negative electrode current collector 12a may be formed from copper or any other appropriate electrically conductive material known to skilled artisans.

The positive electrode 14 may be formed from any lithium-based active material that can sufficiently undergo lithium intercalation and deintercalation while functioning as the positive terminal of the lithium ion battery 10. The positive electrode 14 may also include a polymer binder material to structurally hold the lithium-based active material together. One common class of known materials that can be used to form the positive electrode 14 is layered lithium transitional metal oxides. For example, in various embodiments, the positive electrode 14 may comprise at least one of spinel lithium manganese oxide ($LiMn_2O_4$), lithium cobalt oxide ($LiCoO_2$), a nickel-manganese-cobalt oxide [$Li(Ni_xMn_yCo_z)O_2$], or a lithium iron polyanion oxide such as lithium iron phosphate ($LiFePO_4$) or lithium iron fluorophosphate ($Li_2FePO_4F$) intermingled in at least one of polyvinyldiene fluoride (PVdF), an ethylene propylene diene monomer (EPDM) rubber, or carboxymethoxyl cellulose (CMC). Other lithium-based active materials may also be utilized besides those just mentioned. Those alternative materials include, but are not limited to, lithium nickel oxide ($LiNiO_2$), lithium aluminum manganese oxide ($Li_xAl_yMn_{1-y}O_2$), and lithium vanadium oxide ($LiV_2O_5$), to name but a few. The positive-side current collector 14a may be formed from aluminum or any other appropriate electrically conductive material known to skilled artisans.

Any appropriate electrolyte solution that can conduct lithium ions between the negative electrode 12 and the positive electrode 14 may be used in the lithium ion battery 10. In one embodiment, the electrolyte solution may be a non-aqueous liquid electrolyte solution that includes a lithium salt dissolved in an organic solvent or a mixture of organic solvents. Skilled artisans are aware of the many non-aqueous liquid electrolyte solutions that may be employed in the lithium ion battery 10 as well as how to manufacture or commercially acquire them. A non-limiting list of lithium salts that may be dissolved in an organic solvent to form the non-aqueous liquid electrolyte solution include $LiClO_4$, $LiAlCl_4$, LiI, LiBr, LiSCN, $LiBF_4$, $LiB(C_6H_5)_4 LiAsF_6$, $LiCF_3SO_3$, $LiN(CF_3SO_2)_2$, $LiPF_6$, and mixtures thereof. These and other similar lithium salts may be dissolved in a variety of organic solvents such as, but not limited to, cyclic carbonates (ethylene carbonate, propylene carbonate, butylene carbonate), acyclic carbonates (dimethyl carbonate, diethyl carbonate, ethylmethylcarbonate), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane), cyclic ethers (tetrahydrofuran, 2-methyltetrahydrofuran), and mixtures thereof.

The microporous polymer separator 16 may comprise, in one embodiment, a polyolefin. The polyolefin may be a homopolymer (derived from a single monomer constituent) or a heteropolymer (derived from more than one monomer constituent), either linear or branched. If a heteropolymer derived from two monomer constituents is employed, the polyolefin may assume any copolymer chain arrangement including those of a block copolymer or a random copolymer. The same holds true if the polyolefin is a heteropolymer derived from more than two monomer constituents. In one embodiment, the polyolefin may be polyethylene (PE), polypropylene (PP), or a blend of PE and PP.

The microporous polymer separator 16 may be a single layer or a multi-layer laminate fabricated from either a dry or wet process. For example, in one embodiment, a single layer of the polyolefin may constitute the entirety of the microporous polymer separator 16. In some practices of this invention, the separator 16 is a fibrous membrane, less than a millimeter thick and having an abundance of pores extending between the opposing surfaces. As another example, however, multiple discrete layers of similar or dissimilar polyolefins may be assembled into the microporous polymer separator 16. The microporous polymer separator 16 may also comprise other polymers in addition to the polyolefin such as, but not limited to, polyethylene terephthalate (PET), polyvinylidene fluoride (PVdF), and or a polyamide. The polyolefin layer, and any other optional polymer layers, may further be included in the microporous polymer separator 16 as a fibrous layer to help provide the microporous polymer separator 16 with appropriate structural and porosity characteristics. Skilled artisans will undoubtedly know and understand the many available polymers and commercial products from which the microporous polymer separator 16 may be fabricated, as well as the many manufacturing methods that may be employed to produce the microporous polymer separator 16. A more complete discussion of single and multi-layer lithium ion battery separators, and the dry and wet processes that may be used to make them, can be found in P. Arora and Z. Zhang, "Battery Separators," *Chem. Rev.*, 104, 4424-4427 (2004).

Figure 2A:
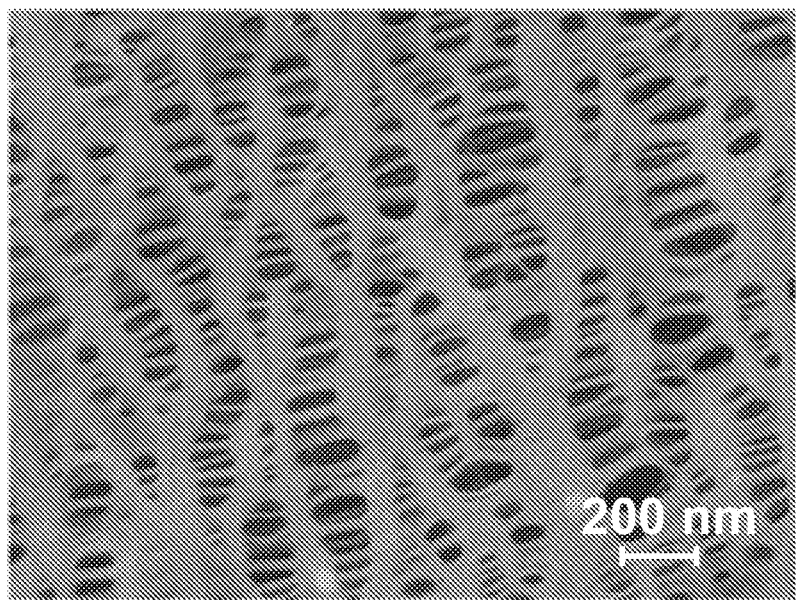
FIG. 2A is a greatly enlarged microscopic view of a small portion of an un-coated porous fibrous polyolefin separator and FIG. 2B is a like enlarged microscopic view of a different small portion of the same separator workpiece after coating with $Al_2O_3$ in accordance with an atomic layer deposition process.

A practice of the invention will be illustrated by an atomic layer deposition process by which a fibrous and porous polypropylene separator membrane is coated with a conformal layer of alumina ($Al_2O_3$) on the fibrous and pore surfaces of the membrane. An enlarged micrograph of an uncoated polypropylene membrane is shown in FIG. 2A. The process will be illustrated by the formation of alumina but the process may also be used to form carbide, nitride, silicide, and other oxide thin films, such as silicon carbide (SiC), and silicon dioxide ($SiO_2$).

Reference may be had to FIGS. 3a-3e which is an enlarged schematic, two-dimensional flow diagram of a surface fragment of a microporous polyolefin separator or like workpiece. FIGS. 3a-3e illustrate repeatable chemical processing steps of a preferred process for progressively forming a conformal alumina ($Al_2O_3$) coating several nanometers in thickness on all surfaces of the workpiece.

Depending upon the polymer composition of the separator material it may be preferred to treat all surfaces of the polymer to form chemical groups, such as hydroxyl groups, for reaction with a vapor comprising metal atoms to be formed on the membrane surfaces. In step (a) of the multi-step FIG. 3a-3e flow diagram, a surface of a fragment of a polyolefin membrane is pretreated with oxygen plasma or with hydrogen peroxide to form —OH groups chemically attached to surface molecules of the polyolefin material. All the surfaces, including pore surfaces, of the membrane workpiece are contacted with the oxidizing reactant to from the hydroxyl groups pendent from surface polymer molecules because these moieties will serve to anchor and bond the aluminum to the surfaces.

One or more pretreated polyolefin membrane workpieces with an abundance of surface hydroxyl groups may then be located, spaced-apart, in a reaction vessel which may be adapted to be evacuated and selectively filled with reactive compositions in vapor or gas form.

A suitable aluminum-containing compound in vapor form is released into the reaction vessel (vessel space is indicated in FIGS. 3a-3e but not vessel walls) and flowed into contact with all surfaces (now hydroxyl group bearing surfaces) of the separator membrane workpieces. The temperature of the workpieces and reaction chamber environment is maintained at a suitable temperature to maintain the aluminum-containing material in the vapor (or gas) phase and to react with the hydroxyl groups of the workpieces. Trimethyl aluminum [$(CH_3)_3Al$, mp 15° C., commercially available] may be released into an evacuated reaction chamber at a temperature of, for example, about 50° C. for reaction with the hydroxyl groups. Sufficient reactant is provided for reaction of the aluminum-containing material with all available hydroxyl groups on the surfaces of the membrane workpieces. Preferably, a stoichiometric excess is provided. In the case of trimethyl aluminum as a source of aluminum atoms for the membrane surface, the trimethyl aluminum reacts with the hydroxyl groups to form methane as a byproduct and to attach dimethyl aluminum through oxygen atoms to the polyolefin surfaces.

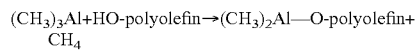

Figure 3A:
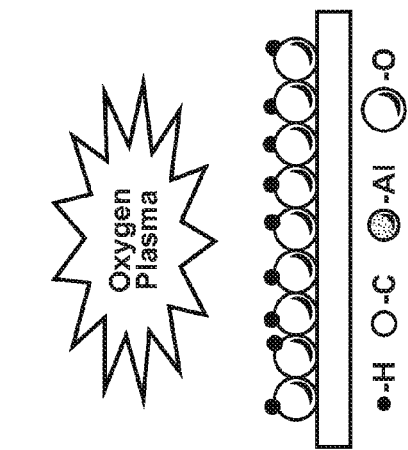
FIGS. 3a-3e present enlarged schematic illustrations of steps of an atomic layer deposition process, including steps (a)-(e), for the formation of an alumina ($Al_2O_3$) conformal coating on the pore surfaces and general surfaces of a fragment of a polyolefin membrane separator workpiece.
Figure 3B:
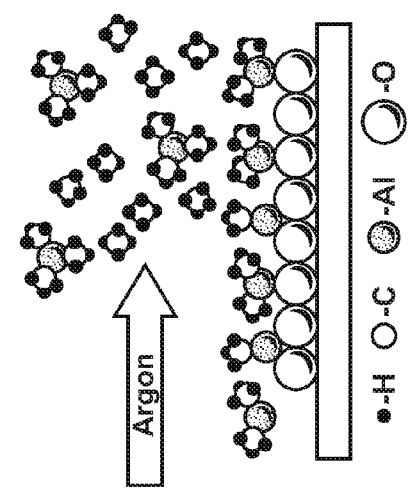

$(CH_3)_3Al + HO\text{-polyolefin} \rightarrow (CH_3)_2Al\text{—O-polyolefin} + CH_4$ This reaction is depicted schematically in FIG. 3b. Aluminum atoms have now been chemisorbed at the surfaces of the separator membrane surfaces. At the completion of the reaction, methane and any residual trimethyl aluminum is removed from the reaction chamber and the vicinity of the polyolefin workpieces by, for example, a stream of argon or other suitable inert gas.

The reaction chamber may be evacuated and water vapor introduced into the chamber for reaction with the dimethyl aluminum moieties attached through oxygen atoms to the polyolefin surfaces. As illustrated schematically at step (c) and in FIG. 3, water reacts with the dimethyl aluminum to release by product methane and to form molecules of $Al_2O_3$.

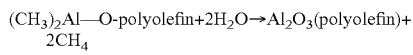

Figure 3C:
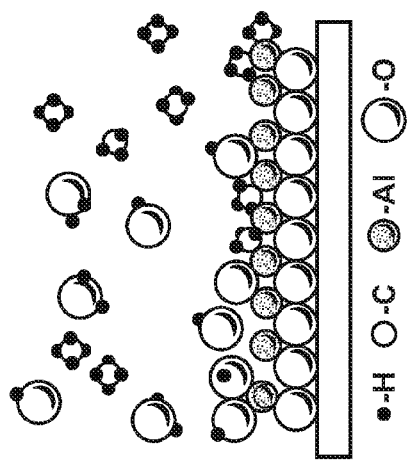

$(CH_3)_2Al\text{—O-polyolefin} + 2H_2O \rightarrow Al_2O_3(\text{polyolefin}) + 2CH_4$ Methane, excess water, and any other byproducts may again be swept from the vicinity of the workpieces by a stream of argon or the like. Some hydrogen may remain on the crystalline alumina. But at the completion of the two-step reaction in FIG. 3c, a conformal substantially single molecular layer of alumina has been formed by chemical reactions at the surfaces of the polymer membrane workpieces. FIG. 3c is schematic and two dimensional and is not intended to illustrate the three-dimensional structure of the $Al_2O_3$ molecular layer.

Figure 3D:
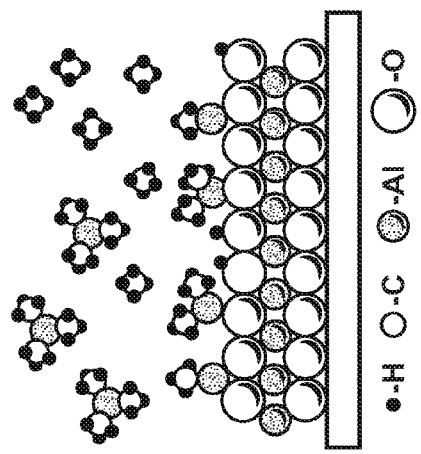
Figure 3E:
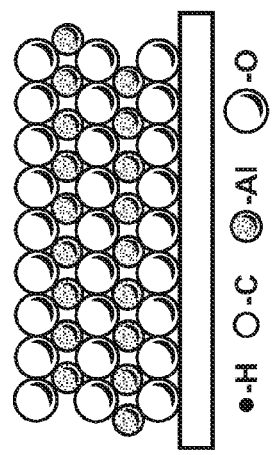

Each two-step, two reaction, cycle may typically be completed in a matter of seconds. At the completion of each such cycle a mono-molecular layer of alumina or other suitable metal carbide, metal nitride or metal oxide may be formed. A typical thickness of each layer is up to a few Angstroms. But the process may be repeated as indicated in FIG. 3d to form additional aluminum oxide molecular layers in illustrated in FIG. 3e. The process may be repeated many times (for example, ten times to a few hundred times) to acquire a multi-molecular thickness of several nanometers. Again, FIGS. 3d and 3e are two-dimensional schematic illustrations of process steps and do not show the three-dimensional structure of the alumina layers.

Figure 2B:
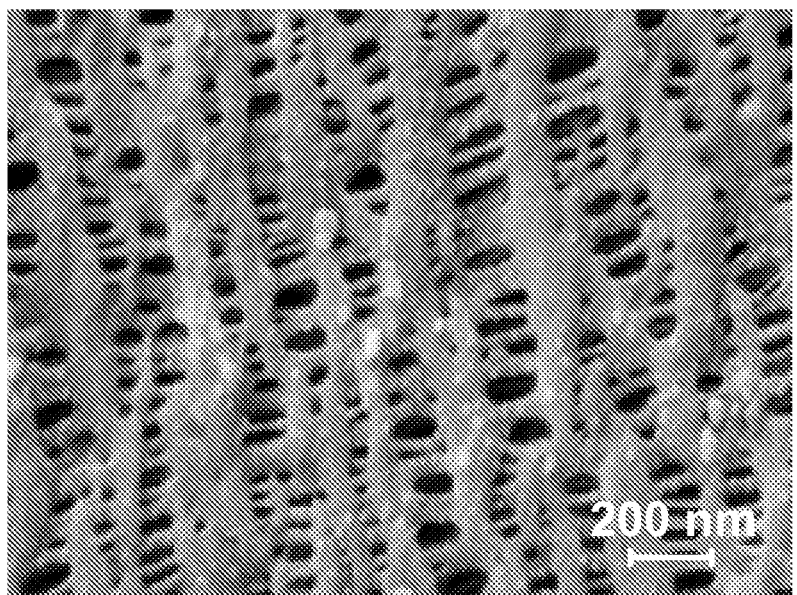

Polypropylene membrane separators have been coated with alumina with thirty such atomic layer deposition cycles and two hundred deposition cycles to produce nanometer thickness coatings. FIG. 2B illustrates a 200 cycle coating formed molecular layer on molecular layer. The alumina coating conforms faithfully to all surfaces of the polyolefin separator material and preserves the excellent porosity of the polyolefin membrane separator workpiece. Both the thirty and two hundred coating cycle procedures yielded high thermal conductivity alumina coatings that increased the start temperature of thermal shrinkage from 80° C. to 110° C. which is very helpful in the operation of many lithium-ion battery designs, especially those having appreciable thermal mass. And it was found that dimethyl carbonate and ethylene carbonate electrolyte solvents thoroughly wetted the aluminum oxide coatings which is helpful for electrolyte retention in and on the polymer separator.

Other electrically resistive ceramic compositions may be deposited on polymer separators and other polymeric workpieces requiring uniform and conformal coatings. The atomic layer deposition practice may be adapted to deposit other metals coupled with, for example, carbon, nitrogen, and or oxygen on polymer surfaces. Volatile and reactive compounds of metals such as aluminum, calcium, manganese, silicon, titanium, and zirconium may be brought into contact with all surfaces of a polymer workpiece to deposit atomic layers of one or more metals on the surface of the workpiece. Carbon dioxide may be brought into contact with the conformal atomic layer of metal(s) to form their carbides. Ammonia may be reacted with the atomic layer of metals to form nitrides. And/or water may be used to convert the metal layer to oxides. Such molecular layers may the increased in thickness for an intended purpose by repeating the two-step process to sequentially deposit more like layers or dissimilar layers.

While preferred embodiments of the invention have been described as illustrations, these illustrations are not intended to limit the scope of the invention.

The invention claimed is:

1. A porous polymer separator membrane for a lithium-ion battery, the membrane having opposing sides with surfaces and open pores that interconnect the sides of the membrane, the pores having surfaces; and all surfaces of the separator having a coextensive coating of separately and sequentially applied molecular layers of an electrically resistive ceramic material that conforms to the surfaces of the separator without closing the open pores.

2. A porous polymer separator membrane for a lithium-ion battery as recited in claim 1 in which the porous polymer separator membrane is formed of a polyolefin.

3. A porous polymer separator membrane for a lithium-ion battery as recited in claim 1 in which the conformal coating of the separator comprises molecules comprising metal atoms and atoms of one or more elements selected from the group consisting of carbon, nitrogen, and oxygen.

4. A porous polymer separator membrane for a lithium-ion battery as recited in claim 1 in which the conformal coating of the surfaces of the separator comprises molecules comprising atoms of one or more metal elements selected from the group consisting of aluminum, calcium, magnesium, silicon, titanium, and zirconium and atoms of one or more non-metal elements selected from the group consisting of carbon, nitrogen, and oxygen.

5. A porous polymer separator membrane for a lithium-ion battery as recited in claim 1 in which the conformal coating of the separator comprises $Al_2O_3$.

6. A porous polymer separator for a lithium-ion battery as recited in claim 1 in which the conformal coating has a thickness of one nanometer or more.

7. A method of forming a conformal, electrically resistive ceramic coating on a porous polyolefin polymer membrane separator for a lithium-ion battery, the porous polymer membrane having opposing side surfaces and open pores with pore surfaces that interconnect the opposing sides, the ceramic coating comprising a metal element and a nonmetal element selected from the group consisting of oxygen, carbon, nitrogen and sulfur, the method comprising:

forming hydroxyl groups on the side surfaces and pore surfaces of a polymer membrane workpiece;

reacting a metal compound vapor with the hydroxyl groups on the surfaces of the polymer membrane workpiece to form a conformal layer comprising the metal to the surfaces of the workpiece;

reacting a non-metal compound vapor containing at least one of oxygen, nitrogen and sulfur with the metal compound on the surfaces of the workpiece to form a conformal layer comprising a solid ceramic metal compound containing at least one of oxygen, carbon, nitrogen, and sulfur, the conformal ceramic metal compound layer being substantially coextensive with the surfaces of the workpiece; and repeating successively the reactions of the metal compound vapor and the non metal compound vapor until a ceramic metal compound layer of desired thickness has been formed.

8. A method as recited in claim 7 in which a ceramic metal compound layer is formed to a thickness of one nanometer or greater.

9. A method as recited in claim 7 in which the metal is one or more of aluminum, calcium, magnesium, silicon, titanium, and zirconium.

10. A method as recited in claim 7 in which hydroxyl groups are formed on the polymer surface by treatment of the surface with hydrogen peroxide or with an oxygen-containing plasma.

11. A method as recited in claim 7 in which the metal compound vapor comprises an organic-metal compound.

12. A method as recited in claim 7 in which the non-metal compound vapor comprises a compound selected from the group consisting of ammonia, carbon dioxide, and water.

13. A method as recited in claim 7 in which the metal compound vapor comprises trimethyl aluminum and the non-metal compound vapor comprises water and the conformal ceramic coating comprises aluminum oxide.

14. A method as recited in claim 7 in which the steps of reacting with a metal compound vapor and non-metal compound vapor are each repeated thirty times or more.

* * * * *